(12) United States Patent
Fukushima

(10) Patent No.: US 9,664,302 B2
(45) Date of Patent: May 30, 2017

(54) FLOW RATE CONTROL DEVICE

(71) Applicant: SMC CORPORATION, Chiyoda-ku (JP)

(72) Inventor: Kenji Fukushima, Tsukuba (JP)

(73) Assignee: SMC CORPORATION, Chiyoda-ku (JP)

( * ) Notice: Subject to any disclaimer, the term of this patent is extended or adjusted under 35 U.S.C. 154(b) by 14 days.

(21) Appl. No.: 14/763,646

(22) PCT Filed: Feb. 14, 2014

(86) PCT No.: PCT/JP2014/053537
§ 371 (c)(1),
(2) Date: Jul. 27, 2015

(87) PCT Pub. No.: WO2014/129407
PCT Pub. Date: Aug. 28, 2014

(65) Prior Publication Data
US 2015/0362089 A1 Dec. 17, 2015

(30) Foreign Application Priority Data
Feb. 20, 2013 (JP) .................. 2013-031435

(51) Int. Cl.
*F16K 35/00* (2006.01)
*F16K 31/60* (2006.01)
(Continued)

(52) U.S. Cl.
CPC ............... *F16K 31/60* (2013.01); *F16K 1/02* (2013.01); *F16K 1/04* (2013.01); *F16K 27/12* (2013.01);
(Continued)

(58) Field of Classification Search
CPC . F16K 31/60; F16K 1/02; F16K 31/50; F16K 27/12; F16K 35/00; F16K 1/04; F16K 35/10; F16K 35/06; G05D 7/0153
(Continued)

(56) References Cited

U.S. PATENT DOCUMENTS

| 4,619,287 A | * | 10/1986 | Hama | ................... F16K 15/148 |
| | | | | 137/512.15 |
| 5,664,447 A | * | 9/1997 | Neeley | .................. E05B 13/001 |
| | | | | 70/175 |

(Continued)

FOREIGN PATENT DOCUMENTS

| JP | 58-12772 | 1/1983 |
| JP | 61-122473 | 8/1986 |

(Continued)

OTHER PUBLICATIONS

Office Action and Search Report issued on Jun. 30, 2015 in the corresponding Taiwanese Patent Application No. 103105069 (with English Translation of pertinent portion).
(Continued)

*Primary Examiner* — John K Fristoe, Jr.
*Assistant Examiner* — Andrew J Rost
(74) *Attorney, Agent, or Firm* — Oblon, McClelland, Maier & Neustadt, L.L.P.

(57) ABSTRACT

A flow rate control device includes a needle valve mounted within a body section and is configured such that the needle valve is advanced and retracted within the body section by the rotation of a handle, thereby adjusting the flow rate of fluid flowing between a first port and a second port. The handle is surrounded by a cover to prevent a change in the adjusted flow rate.

8 Claims, 10 Drawing Sheets

(51) Int. Cl.
*F16K 1/04* (2006.01)
*G05D 7/01* (2006.01)
*F16K 1/02* (2006.01)
*F16K 27/12* (2006.01)
*F16K 31/50* (2006.01)

(52) U.S. Cl.
CPC .............. *F16K 31/50* (2013.01); *F16K 35/00* (2013.01); *G05D 7/0153* (2013.01)

(58) Field of Classification Search
USPC .............................. 251/318, 215, 90; 70/178
See application file for complete search history.

(56) References Cited

U.S. PATENT DOCUMENTS

| | | | | |
|---|---|---|---|---|
| 5,823,023 | A | * | 10/1998 | Benda ...................... F16K 35/06 137/385 |
| 6,038,893 | A | * | 3/2000 | Neeley .................. E05B 13/001 70/175 |
| 6,718,804 | B1 | * | 4/2004 | Graves .................... F16K 27/12 137/553 |
| 2010/0155641 | A1 | | 6/2010 | Masamura |
| 2010/0218830 | A1 | | 9/2010 | Yoon |
| 2012/0273074 | A1 | | 11/2012 | Yamada et al. |

FOREIGN PATENT DOCUMENTS

| | | |
|---|---|---|
| JP | 2008-69936 | 3/2008 |
| JP | 2008-232382 | 10/2008 |
| JP | 2010-144874 | 7/2010 |
| JP | 2011-149488 | 8/2011 |
| TW | I331196 B | 12/2008 |
| TW | 201126083 A1 | 8/2011 |

OTHER PUBLICATIONS

International Search Report issued May 20, 2014 in PCT/JP2014/053537 filed Feb. 14, 2014.

* cited by examiner

FLOW RATE CONTROL DEVICE

TECHNICAL FIELD

The present invention relates to a flow rate control device, which is capable of controlling the flow rate of a fluid such as a pressure fluid or the like by displacement of a valve body.

BACKGROUND ART

The present applicant have proposed a flow rate control device, which is connected via a tube to a fluid pressure device such as a cylinder or the like, and which is capable of controlling operations of the fluid pressure device by adjusting, with the position of a valve body, the flow rate of a fluid that is supplied to and discharged from the fluid pressure device (see, Japanese Laid-Open Patent Publication No. 2011-149488).

SUMMARY OF INVENTION

The present invention has been devised in relation to the aforementioned proposal, and has the object of providing a flow rate control device, which is capable of avoiding a flow rate that has been preset beforehand from becoming changed, due to a displacement in the position of a valve body which has once been set.

For achieving the aforementioned object, the present invention is characterized by a flow rate control device, which by displacement of a needle valve is configured to control a flow rate of a fluid that flows between a couple of a first port and a second port. In particular, the flow rate control device comprises:

a first body including the first port, and which includes a joint mechanism to which a tube is connected that supplies or discharges the fluid;

a second body connected to the first body, and which includes the second port through which the fluid is discharged or supplied; and a handle connected to the needle valve, and which is configured to adjust the flow rate of the fluid by causing axial displacement of the needle valve under a rotary action of the handle.

The flow rate control device further comprises a cover that surrounds the handle in a removable manner.

According to the present invention, since the cover is provided, which surrounds the handle in a removable manner, after the cover has been installed thereon, the handle is prevented from being touched. Consequently, the flow rate of the fluid, which has been set beforehand by the handle, can be prevented from being changed.

Further, in the present invention, a projection may be provided on the cover, the projection engaging with the handle to thereby attach the cover to the handle.

In accordance with such a structure, since a locked state between the projection and the handle can be obtained, a further operation of the handle, which has been used to set the flow rate of the fluid, can be prevented by the presence of the cover, and thus the flow rate of the fluid in a stable condition can be assured.

Furthermore, the present invention is characterized by providing a release member on the cover, and by providing the projection on an inner surface of the release member.

As a result of such a structure, the cover can be removed from the handle as needed, and a desired flow rate for the fluid can be set by readjusting the handle.

Still further, the present invention is characterized in that a shoulder portion, with which the projection of the cover engages, is disposed on an outer side of the handle.

In accordance with this structural feature, dislodgement of the cover from the shoulder portion of the handle is prevented.

Further still, the present invention is characterized in that the release member, which is disposed on the cover, is formed by a groove provided on the cover, the release member being flexed outwardly by the groove, such that engagement of the projection with the handle is released.

In this manner, since the release member is formed integrally with the cover, and the cover can be separated from the handle by flexing the release member, there is not the slightest difficulty when the flow rate of the fluid is reset.

Further still, the present invention is characterized in that an arcuately shaped opening configured to insert therein a leg member of a jig is provided in the cover. In addition, by insertion of the jig into the arcuately shaped opening, the jig flexes the release member outwardly, such that engagement of the projection with the handle is released.

In this manner, since the cover can be separated from the handle upon flexing of the release member by insertion of the jig into the arcuately shaped opening of the cover, there is not the slightest difficulty when the flow rate of the fluid is reset.

Further, the present invention is characterized in that the cover is equipped with a handle portion configured to attach a binding member thereto.

In this manner, by attaching a binding member such as a wire or the like with respect to the handle portion, separation between the cover and the flow rate control device can be avoided.

Still further, the present invention is characterized in that the first body includes a main body section extending in an axial direction, and a connecting section arranged perpendicularly to the axial direction. In addition, the cover includes a cutout that is fitted over a proximal end portion of the connecting section on a side of the main body section.

In accordance with this structure, since the cutout is fitted over the main-body-side proximal end portion of the connecting section, an increase in the size or scale of the flow rate control device by mounting of the cover thereon can be avoided.

Further still, the present invention is characterized in that the handle portion is disposed directly above a cutout that is fitted over the proximal end portion on the side of the main body section.

By providing such a structure, the binding member can easily be connected, for example, to a tube.

According to the present invention, the following advantageous effect is obtained.

In the flow rate control valve, which controls the flow rate of a fluid that flows between the first port and the second port by causing the needle valve to be displaced, by surrounding the handle, which carries out a displacement operation of the needle valve, with the cover, any change in the flow rate of the fluid that has once been adjusted can be avoided.

The above and other objects, features and advantages of the present invention will become more apparent from the following description when taken in conjunction with the accompanying drawings in which a preferred embodiment of the present invention is shown by way of illustrative example.

DESCRIPTION OF EMBODIMENTS

A preferred embodiment of a flow rate control device according to the present invention will be described in detail below with reference to the accompanying drawings.

In FIGS. 1 through 4, reference numeral 10 indicates the flow rate control device according to the embodiment of the present invention.

As shown in FIGS. 1 through 4, the flow rate control device 10 includes a first body 14 including a first port 12 through which a pressure fluid is supplied, a second body 18 including a second port 16 through which the pressure fluid is discharged and which is assembled with respect to a lower part of the first body 14, a handle (operating member) 20 used for adjusting the flow rate and which is disposed rotatably on an upper part of the first body 14, a needle valve 22, which is inserted into the handle 20, and which controls the flow rate of the pressure fluid (e.g., compressed air) that flows between the first port 12 and the second port 16 by advancing and retracting the needle valve 22 in an axial direction (the directions of arrows A and B) in the interior of the first body 14 under a rotary action of the handle 20, and a cover 24 that surrounds the handle 20 in a removable manner.

Figure 3:
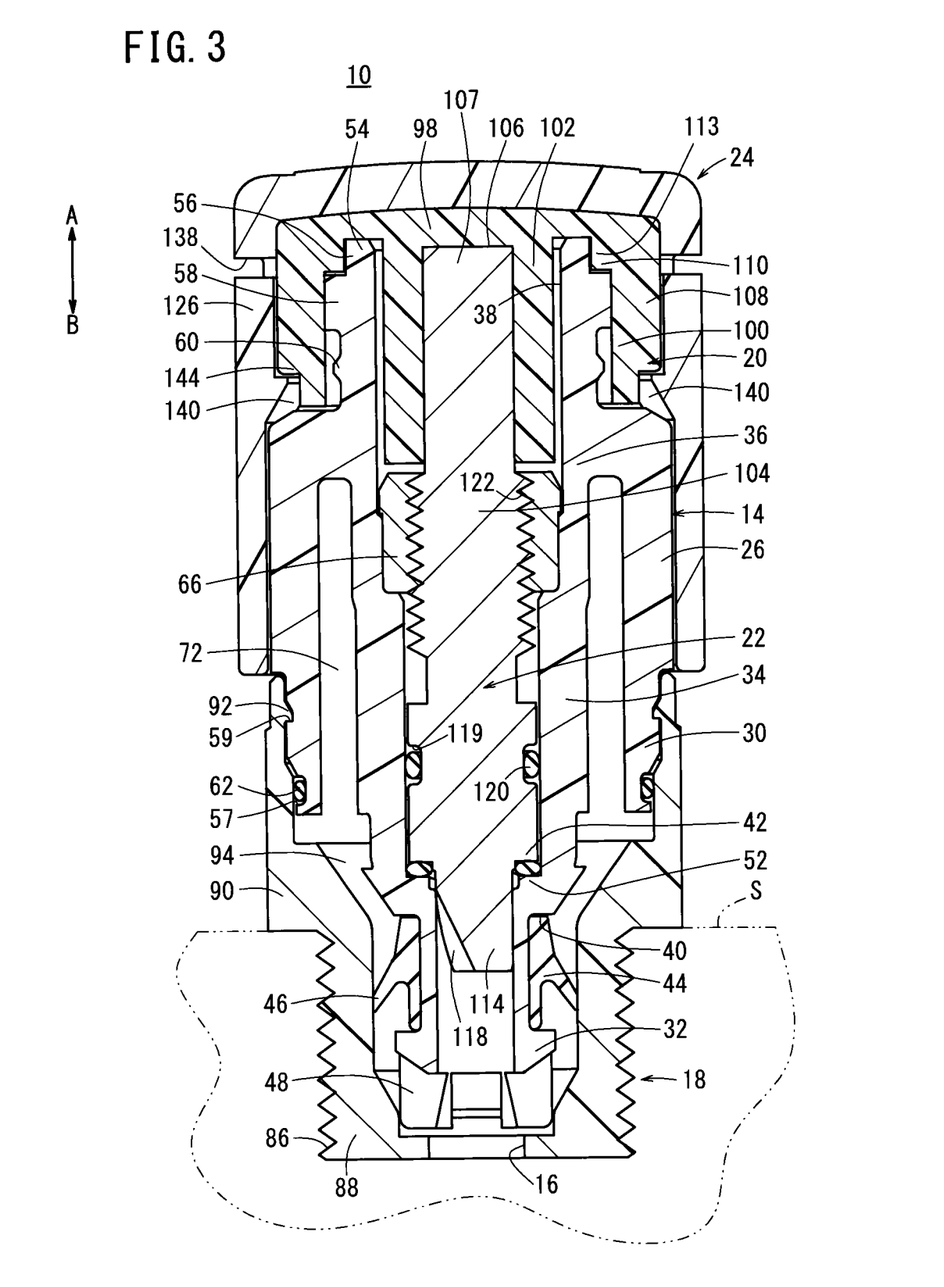
FIG. 3 is a vertical cross sectional view taken along line III-III of the flow rate control device shown in FIG. 1.
Figure 4:
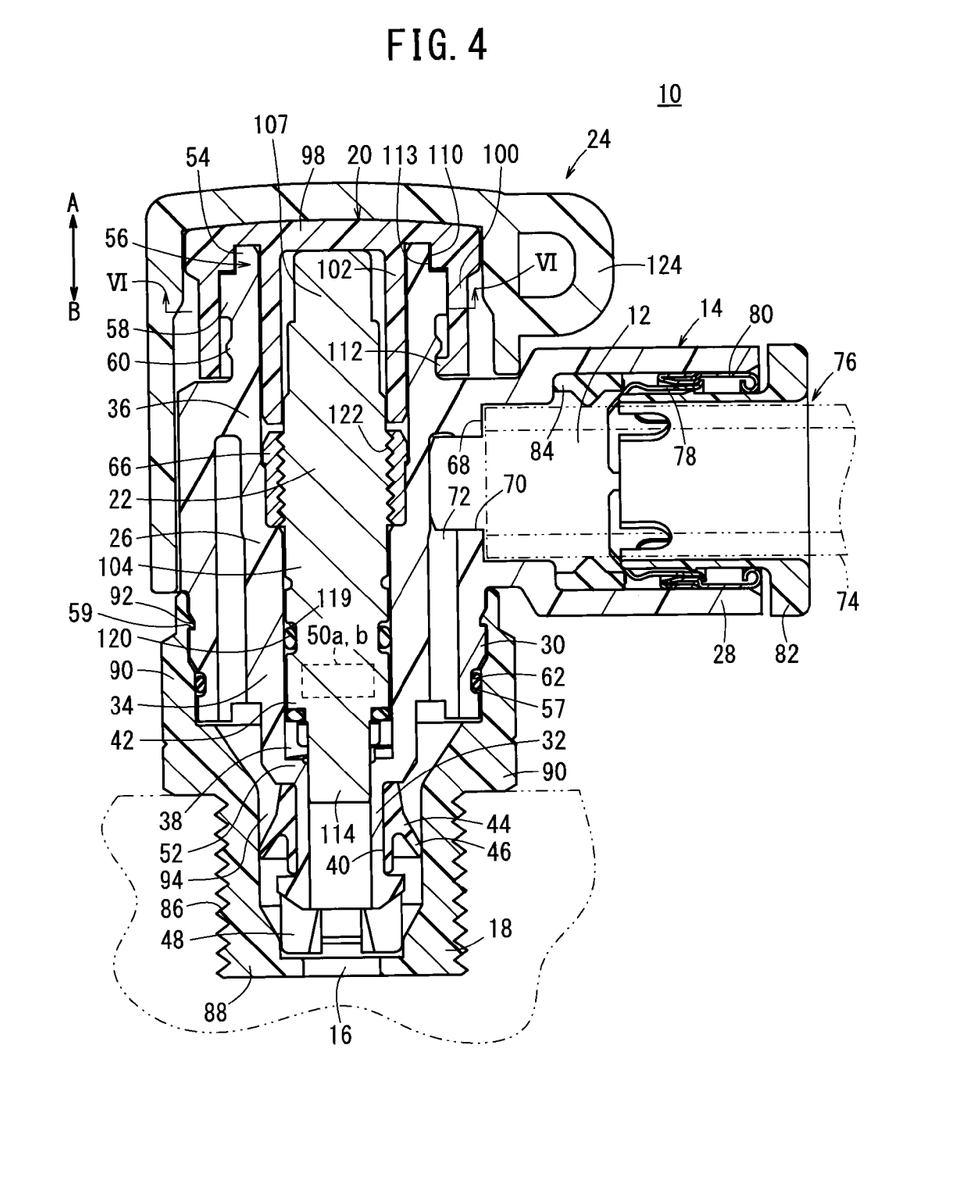
FIG. 4 is a vertical cross sectional view taken along line IV-IV of the flow rate control device shown in FIG. 1.

The first body 14 is constituted from a hollow main body section 26 formed from a resin material, for example, which extends a predetermined length in the axial direction (the directions of arrows A and B), a connecting section 28 that extends perpendicularly to the axial direction of the main body section 26 and includes the first port 12 in the interior thereof, and a first coupling part 30 formed on the outer circumferential side of the main body section 26 and which is coupled to the second body 18.

The main body section 26 includes a first cylindrical portion 32 formed on a bottom portion thereof, a second cylindrical portion 34 formed integrally with an upper part of the first cylindrical portion 32 and which is expanded in diameter with respect to the first cylindrical portion 32, and a third cylindrical portion 36 formed integrally with an upper part of the second cylindrical portion 34 and which is expanded in diameter with respect to the second cylindrical portion 34. In addition, a penetrating hole 38 is formed in the interiors of the first through third cylindrical portions 32, 34, 36.

The penetrating hole 38 is formed such that inner diameters thereof become greater respectively in a stepwise manner corresponding to the first through third cylindrical portions 32, 34, 36. The needle valve 22 protrudes into the penetrating hole 38 displaceably in the axial direction.

On an outer circumferential surface of the first cylindrical portion 32, a check valve 44 made from a synthetic rubber material or the like is installed through an annular groove 40. The check valve 44 includes a flange 46 that projects in a radial outward direction. The flange 46 is formed with a downwardly opening V-shape substantially in cross section, and the distal end thereof abuts resiliently against the inner wall surface of the second body 18.

Plural fins 48, which are directed radially outward and are separated at equal intervals along the circumferential direction, are formed on a lower end of the first cylindrical portion 32. The plural fins 48 serve to rectify the fluid that flows between the first port 12 and the second port 16.

On a peripheral wall of the second cylindrical portion 34, a pair of communication holes 50a, 50b are formed (see FIG. 4), which communicate with a space on the inside of the penetrating hole 38 and the first coupling part 30. The communication holes 50a, 50b are substantially rectangular shaped.

A seat 52 on which the needle valve 22 can be seated is formed at a boundary site between the first cylindrical portion 32 and the second cylindrical portion 34. Actually, a later-described shoulder portion 42 of the needle valve 22 is seated on the seat 52. An illustrated O-ring may be mounted on the shoulder portion 42.

The first coupling part 30 is formed integrally on an outer circumferential surface between the second cylindrical portion 34 and the third cylindrical portion 36. Together therewith, the connecting section 28 that extends in a radial outward direction is formed integrally on a part of the peripheral wall of the first coupling part 30.

A first meshing portion 56, on which a plurality of cross-sectional triangular shaped teeth 54 project at equal intervals along the outer circumferential surface thereof, is disposed on an upper part of the third cylindrical portion 36. As will be discussed later, the first meshing portion 56 is placed in meshing engagement with a second meshing portion 110 of the handle 20.

Furthermore, below the first meshing portion 56, a first projection 58, which projects radially outward, and a second projection 60, which is formed further below the first projection 58 and has a smaller diameter than the first projection 58, are disposed respectively.

In this case, a first annular groove 57 is formed in the vicinity of the lower end of the first coupling part 30, and a second annular groove 59 is formed above the first annular groove 57. An O-ring 62 is installed in the first annular groove 57. The O-ring 62 is pressed in contact against an inner circumferential surface of a later-described tightening member 90 of the second body 18. On the other hand, a pawl 92 that projects outward annularly from a distal end inner circumferential wall of the tightening member 90 is fitted into the second annular groove 59. This serves to prevent the main body section 26 from becoming dislodged from the second body 18.

A nut 66 is installed in the interior of the third cylindrical portion 36. As shown in FIGS. 3 and 4, female threads that make up the nut 66 are screw engaged with male threads 122 of the needle valve 22, as will be described later.

On a proximal end side of the first port 12, a connecting hole 70 is formed through a stepped portion 68. The connecting hole 70 communicates with a flow path 72 provided between the outer periphery of the main body section 26 and the first coupling part 30. A joint mechanism 76 for connecting a tube 74 through which a pressure fluid is supplied is formed in the first port 12.

The joint mechanism 76 includes a chuck 78 that engages with the tube 74 that is inserted into the first port 12, a guide 80 that surrounds the chuck 78, a release bush 82 displaceable along the guide 80, and which expands or widens the distal end of the chuck 78, and thereby releases the engaged condition with the tube 74, and a packing 84 that abuts against an outer circumferential surface of the tube 74.

The second body 18 is formed from a resin material, for example. An attachment member 88 on which threads 86 are engraved is formed on the outer circumference of one end of the second body 18, and is formed with the cross-sectional hexagonal shaped tightening member 90 on the other end thereof. Reference numeral 94 indicates a flow path, which is formed between the first cylindrical portion 32 and the inner circumferential wall of the second body 18. The flow path 94 communicates with the flow path 72.

The tightening member 90 is used when the flow rate control device 10 of the present embodiment is attached to another fluid pressure device S or the like, by a tool such as a non-illustrated spanner that utilizes the cross-sectional shape of the tightening member 90.

Figure 5:
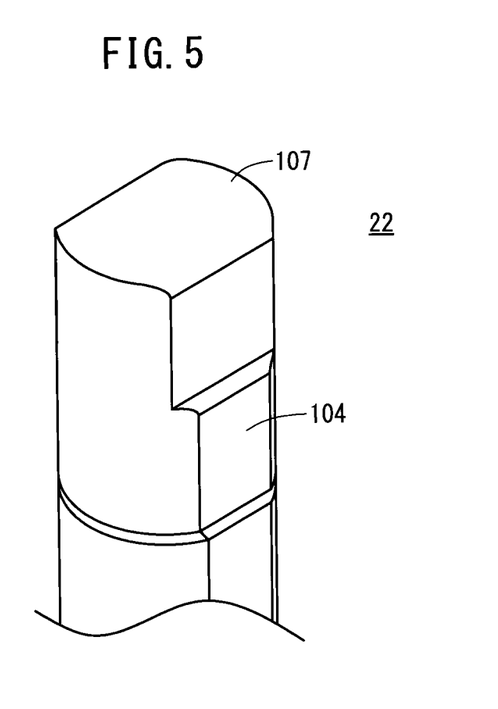
FIG. 5 is a perspective view with partial omission of a needle valve of the flow rate control device shown in FIG. 1.
Figure 6:
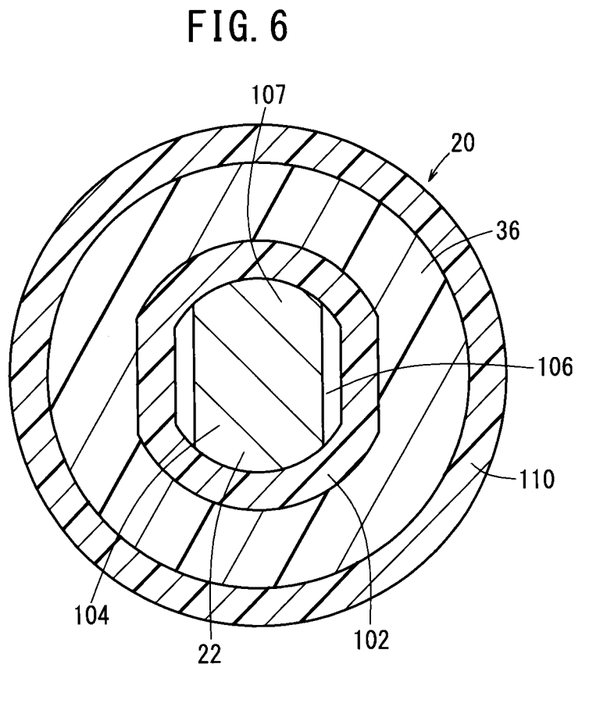
FIG. 6 is a cross sectional view taken along line VI-VI of the flow rate control device shown in FIG. 4.

The handle 20 is formed in a bottomed cylindrical shape, with a disk-shaped base section 98 formed on one end side thereof, and an annular outer wall 100 being formed to project along an outer circumferential edge on the other end side of the base section 98, together with an inner wall 102 being formed to project on an inner circumferential side thereof. An adjustment member 107, which is formed on an end of a shaft 104 that makes up the needle valve 22, is accommodated in a deformed rectangular space 106 formed by the inner wall 102 (see FIG. 6). As shown in FIG. 5, the adjustment member 107 has a deformed rectangular shape as viewed in plan, which as shown in FIG. 6, is fitted into the inner wall 102 of the handle 20.

Actually, the inner wall 102 of the handle 20 is inserted along the inner wall of the third cylindrical portion 36, in a state in which the needle valve 22 has been inserted through the first cylindrical portion 32, the second cylindrical portion 34, and the third cylindrical portion 36. As a result, the outer wall 100 is fitted externally over the third cylindrical portion 36.

Figure 2:
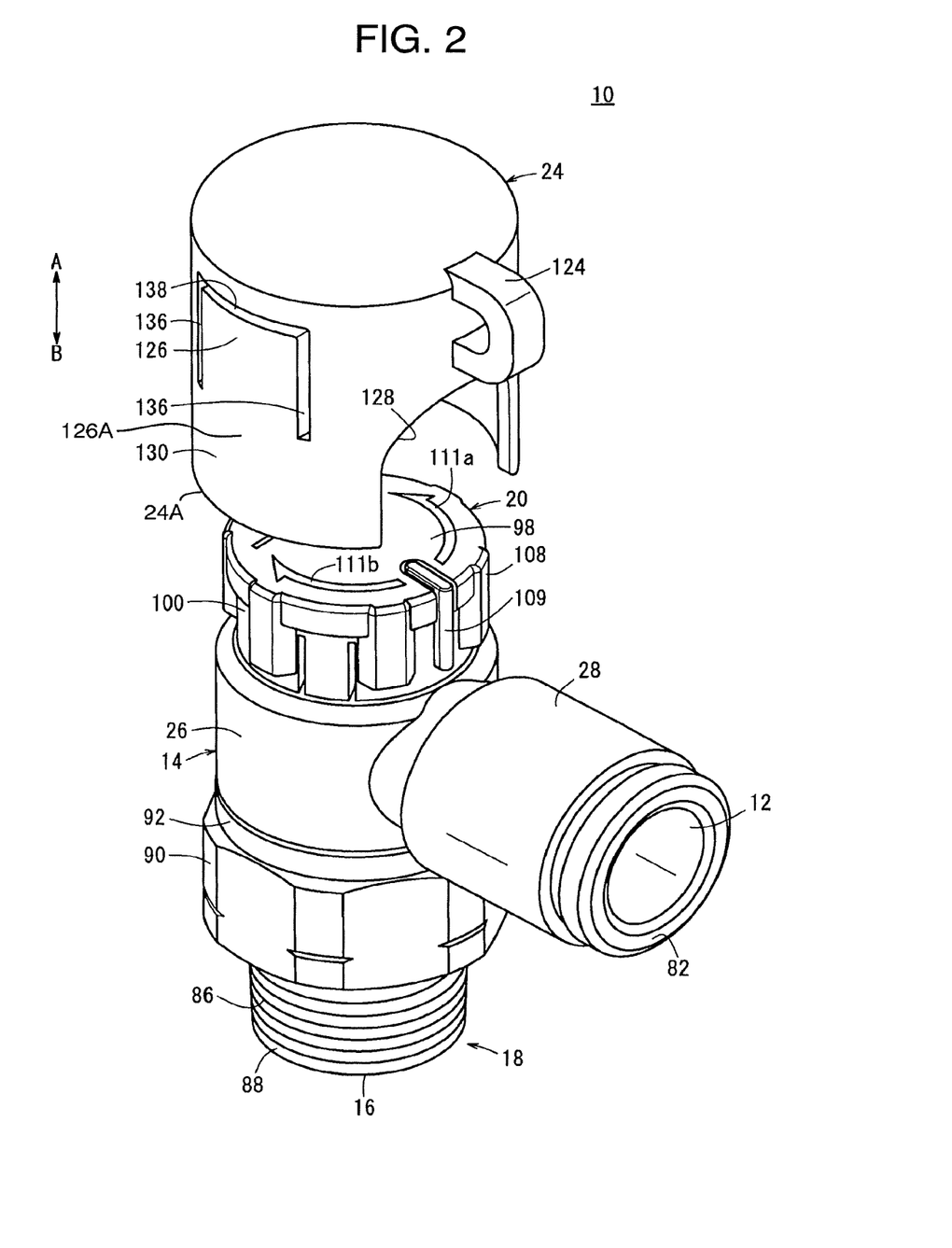
FIG. 2 is a partially exploded perspective view showing a condition in which a cover has been removed, in the flow rate control device shown in FIG. 1.

As shown in FIG. 2, on the outer circumferential surface of the outer wall 100, there are provided a plurality of gripping members (shoulder portions) 108, which project radially outward at equal intervals in the circumferential direction and extend in the axial direction. The gripping members 108 serve a function to prevent or stop slippage when the handle 20 is subjected to a rotating operation by a non-illustrated operator. Furthermore, in addition to the gripping members 108, on the handle 20, there is provided an origin point unit 109, which serves as a reference for rotational movement of the handle 20. In addition, on the surface of the base section 98, arrows 111a, 111b are provided, which indicate the direction of rotation thereof.

The second meshing portion 110, which meshes with the teeth 54 of the first meshing portion 56, is formed to project on an inner circumferential wall of the proximal end side of the outer wall 100. The second meshing portion 110 is constituted from cross-sectional triangular shaped teeth 113, which project radially inward from the inner circumferential surface of the outer wall 100, plural ones of which are provided at equal angular intervals along the circumferential direction of the handle 20.

Hook pieces 112, which are bent radially inward at a right angle, are disposed on a distal end of the outer wall 100. The hook pieces 112 are disposed in plurality (e.g., at three locations) and at equal angular distances along the circumferential direction of the handle 20. When the handle 20 is displaced upwardly, the hook pieces 112 overcome or get over the second projection 60 and come into engagement against the lower surface of the first projection 58. Thus, by preventing further upward displacement of the handle 20, the hook pieces 112 function to prevent the handle 20 from being pulled off.

The needle valve 22 includes a control section 114 on one end thereof, which is capable of controlling the flow rate of the fluid, the shoulder portion 42 connected to an upper portion of the control section 114 and which can be seated on the seat 52 of the first body 14, and the shaft 104 that extends integrally in an axial direction from the shoulder portion 42.

The control section 114 includes a cutout groove 118, which is cut out with a triangular shape in cross section, and extends so as to intersect with the axial direction on one end of the control section 114. As the cutout groove 118 extends to the side of the shaft 104, the cross section thereof becomes greater in size (see FIG. 3).

An annular groove 119 is provided on the outer circumferential surface of the needle valve 22, and an O-ring 120 is installed in the annular groove 119. The O-ring 120 is pressed into contact with the inner circumferential surface of the penetrating hole 38.

The male threads 122 are engraved on the outer circumferential surface of the shaft 104. The male threads 122 are screw-engaged with female threads of the nut 66 that is fixed to the interior of the main body portion 26.

Figure 1:
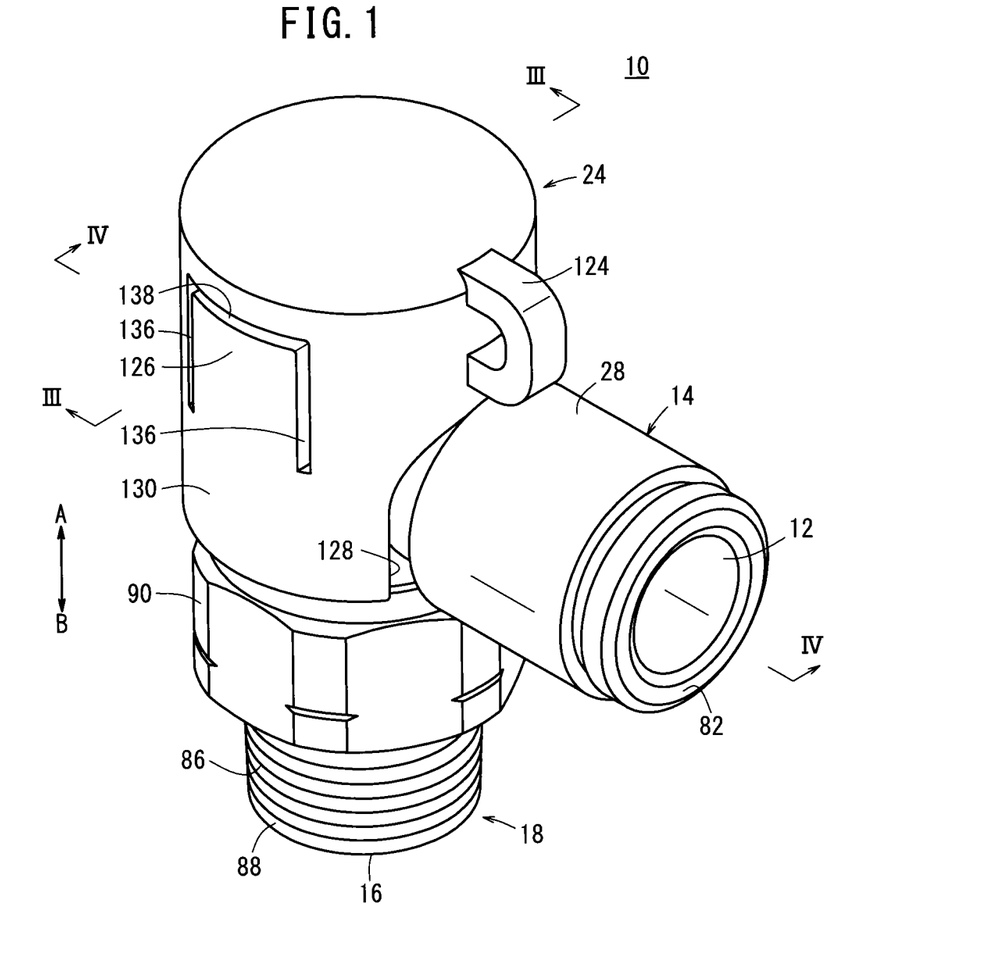
FIG. 1 is a perspective view showing the overall structure of a flow rate control device according to an embodiment of the present invention.

As shown in FIGS. 1 and 2, the cover 24 is formed in a bottomed cylindrical shape with an insertion opening 24A at an end opposite the bottom, and into which the handle 20 may be inserted such that the cover is removably attached with respect to the handle 20. A handle portion 124 (see FIG. 2) is provided on an outer circumferential part on an upper end of the cover 24. One end of the handle portion 124 resides on the top corner of the cover 24, and the other end terminates on the outer peripheral wall of the cover 24. Release members 126, which are cut in a downwardly oriented U-shape, are formed on a side of the outer peripheral wall at positions that are moved substantially 90 degrees on the left and right along the circumferential direction from the handle portion 124. The release members 126 are provided as a diagonally symmetric pair. The release members 126 are each formed, respectively, by a pair of vertical grooves 136 provided on the outer circumferential wall of the cover 24, and a horizontal groove 138 that communicates with upper ends of the vertical grooves 136, whereby the release members 126 are each supported on the outer peripheral wall of the cover 24 by the support region 126A where no groove is present. On the other hand, underneath the handle portion 124, a U-shaped cutout 128 is formed, which is fitted over a circular shaped proximal end portion of the connecting section 28, such that an outer peripheral wall along a circumferential direction from the cutout 128 serves as a skirt section 130 that surrounds the first body 14.

The handle portion 124 projects outwardly in parallel with the longitudinal direction of the connecting section 28 at the time that the cover 24 is mounted over the handle 20. A non-illustrated binding member such as a wire or the like is attachable to the handle portion 124.

On inner circumferential surfaces of the release members 126, and at a portion of the release members 126 spaced from the support regions 126A, third projections 140 are provided that project toward the axis (see FIG. 3). When the cover 24 is fitted externally over the handle 20, the third projections 140 engage with bottom surfaces 144 of the gripping members 108 of the handle 20, thereby preventing dislodgement of the cover 24 from the handle 20.

The flow rate control device 10 according to the embodiment of the present invention is constructed basically as described above. Next, operations and advantages of the flow rate control device 10 will be described below.

As shown in FIG. 2, a completely closed condition in which the cover 24 is taken off from the handle 20, and communication between the first port 12 and the second port 16 is blocked, and moreover, a state in which rotational displacement of the handle 20 is restricted (a rotation locked state), will be referred to as an initial condition.

More specifically, the completely closed condition indicates a state in which the shoulder portion 42 of the needle valve 22 is seated on the seat 52, and communication between the first port 12 and the second port 16 is blocked. Further, the condition (rotation locked state) in which rotational displacement of the handle 20 is restricted indicates a state in which the handle 20 is moved downwardly in FIG. 4, such that the first meshing portion 56 and the second meshing portion 110 engage with each other, thus restricting any rotational displacement of the handle 20.

In the initial condition, the threads 86, which are formed on the attachment member 88 of the second body 18 of the flow rate control device 10, are screw-inserted into the female threads of one of the ports of a non-illustrated fluid pressure device S, for example, an air pressure cylinder. Similarly, a flow rate control device 10 of the same structure is attached under the initial condition to the other port of the air pressure cylinder. Below, since the two flow rate control devices 10, which are attached to the cylinder, are handled in the same way, as necessary, only one of the flow rate control devices 10 will be described. Next, the tube 74 is inserted up to the stepped portion 68 from the side of the release bush 82 of the joint mechanism 76. Upon slightly pulling out the tube 74, the distal end of the chuck 78 bites into the tube 74, and thus separation of the tube 74 is prevented.

Next, when the handle 20 is grasped and pulled upwardly in FIG. 4, the hook pieces 112 that are formed on the outer wall 100 of the handle 20 overcome the second projection 60, and come into abutment against the lower surface that is formed around the first projection 58. A sensation when the hook pieces 112 overcome the second projection 60 and then come into abutment against the lower surface of the first projection 58 can be confirmed sensorially by the operator. In this manner, under a state in which the hook pieces 112 are in abutment against the lower surface of the first projection 58, further separation of the handle 20 from the main body section 26 is prevented. In this state, the adjustment member 107 of the needle valve 22 is still retained in its state of abutment with the side surface of the inner wall 102 of the handle 20.

Then, the operator turns the handle 20 in the direction shown by the arrow 111a in FIG. 2. Accordingly, under a screw-engaged action of the male threads 122 of the needle valve 22 with the female threads of the nut 66, the needle valve 22 moves upwardly in FIG. 4. As a result, when the shoulder portion 42 of the needle valve 22 separates away from the seat 52, the cutout groove 118 that is formed on the one end of the needle valve 22 also moves upwardly, whereupon the first port 12 of the connecting section 28 and the second port 16 disposed in the second body 18 are placed in communication through the communication holes 50a, 50b formed in the main body section 26.

Furthermore, after the handle 20 has been rotated in the direction of the arrow 111a, rotational movement of the handle 20 is stopped once at an appropriate position. Consequently, the opening area between the cutout groove 118 of the needle valve 22 and the inner wall of the first cylindrical portion 32 or the second cylindrical portion 34 is determined. In such a condition, when compressed air from a compressed air supply source (not shown), for example, is supplied from the tube 74 that is connected to the flow rate control device 10 disposed on the other side of the cylinder, after the compressed air has flexed the flange 46 of the check valve 44 outwardly in the axial direction, i.e., when passage of the compressed air to the flow path 94 is prevented, the compressed air passes only through the cutout groove 118 whose position has been adjusted, and is discharged to the exterior from the second port 16. Stated otherwise, the flow rate of the compressed air is throttled by the cutout groove 118. During this action, movement of the piston inside the non-illustrated cylinder together with the velocity thereof are controlled by the opening passage between the cutout groove 118 and the inner wall of the first cylindrical portion 32 (or the second cylindrical portion 34), and can be grasped to a certain extent by the operator.

Assuming the operator is satisfied with the velocity of the piston, by carrying out the same operation also in the flow rate control device 10 of the present embodiment that is attached to the one port of the aforementioned cylinder, adjustment of the needle valve 22 therein is performed. At this time, by referring to the position indicated by the origin point unit 109 of the handle 20 of the other flow rate control device 10, position information of the origin point unit 109 can be made use of.

Thus, if a desired flow rate control could not be performed, the operator turns the handle 20 further in the direction of the arrow 111a, or depending on the circumstances in the direction of the arrow 111b, and can thereby control the degree of penetration of the needle valve 22 into the interior of the first cylindrical portion 32. At this time, since the origin point unit 109 formed on the handle 20 indicates the origin of rotation of the handle 20, the degree by which the handle 20 has been rotated can easily be confirmed.

In addition, after adjustments have been made such that the discharge flow rate of the air from the cylinder is at a desired rate, the operator presses downwardly on the handle 20 in FIGS. 1 through 4. Consequently, the hook pieces 112 of the handle 20 overcome and move below the second projection 60 formed on the main body section 26, and as shown in FIG. 4, the hook pieces 112 are stopped in front of the connecting section 28. As a result, in a state in which downward pressing on the handle 20 is completed, the first meshing portion 56 of the main body section 26 is placed in meshing engagement with the second meshing portion 110 of the handle 20. In this case, since the main body section 26 is assembled together integrally with the second body 18, further screw-rotation of the handle 20 is restricted. Accordingly, a desired velocity for the piston of the cylinder can be assured.

According to the present embodiment, in a state in which the velocity of the piston of the cylinder has been fixed as described above, the cover 24 is fitted over the handle 20 from the outer side thereof. More specifically, using the U-shape cutout 128 of the cover 24, the cover 24 is mounted onto the proximal end side of the connecting section 28. At this time, the third projections 140, which are provided on the inner side of the release members 126, are moved along the outer circumferential wall of the handle 20, and ultimately overcome the gripping members 108 of the handle 20. Since the third projections 140 are formed inwardly of the release members 126, when the cover 24 is pressed downwardly in FIG. 3 with respect to the handle 20, the gripping members 108 of the handle 20 can easily be overcome under an action in which the release members 126 are pressed slightly outward. By the third projections 140 overcoming the gripping members 108, the cover 24 is prevented from being moved in an upward direction in FIG. 3. Consequently, a screw-rotating operation of the handle 20 becomes impossible, and the flow rate of the air, which was set by the handle 20, can be secured in a stable condition.

For avoiding loss of the cover 24, one end of a non-illustrated string may be tied to the handle portion 124, and the other end thereof may be tied to the non-illustrated fluid pressure device S. Further, the one end of the string may be tied to the tube 74. As a result, loss of the cover 24 can be prevented.

Next, a situation will be described in which the non-illustrated fluid pressure device S, for example, the velocity of the piston in the cylinder, is readjusted by the flow rate control device 10 according to the present embodiment.

The non-illustrated string that has been applied to the handle portion 124 is untied, and the cover 24 is detached from the handle 20. At that time, a tapered flat tool such as the distal end of a screwdriver is inserted into the horizontal groove 138 of the release members 126. In addition, the release members 126 are flexed outwardly. Consequently, the third projections 140 become detached from the gripping members 108 of the handle 20, and thus the cover 24 can easily be removed from the handle 20.

Next, once again, the handle 20 is pulled upwardly from the main body section 26 in FIG. 3, whereupon engagement between the first meshing portion 56 and the second meshing portion 110 is released, and the needle valve 22 can be subjected to a rotational operation in the same manner as described previously.

In the foregoing manner, according to the present invention, when the flow rate of the fluid between the first port 12 and the second port 16 has been adjusted by effecting screw-rotation of the needle valve 22, the cover 24 is disposed with respect to the handle 20 that is used for rotating the needle valve 22, whereby unexpected rotation of the handle 20 can reliably be prevented. As a result, reliable operation of a non-illustrated fluid pressure device S, for example a cylinder, can be assured over a long period of time in a continuously stable condition.

Next a modification of the cover 24 in the aforementioned embodiment is shown in FIGS. 7 through 10.

Figure 7:
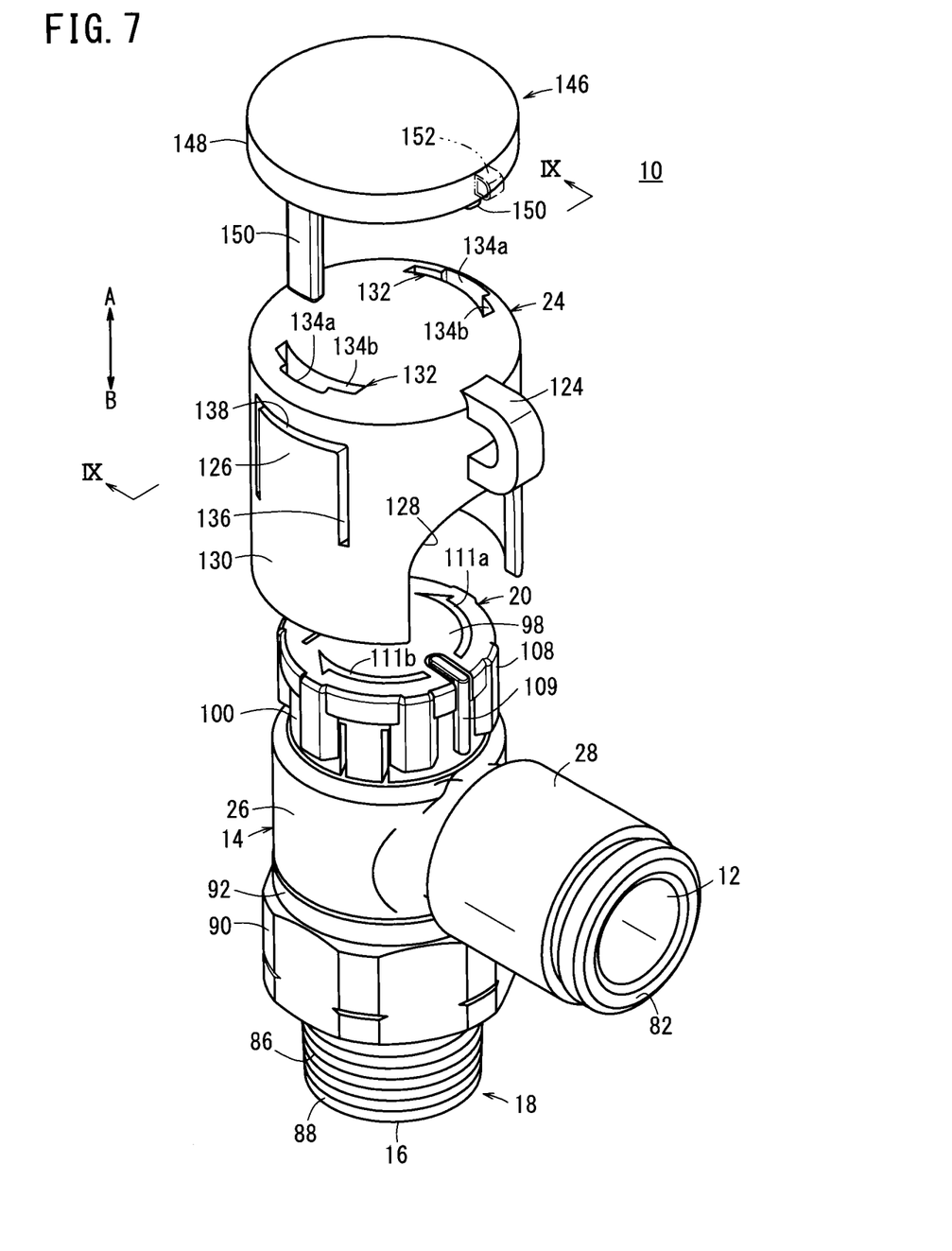
FIG. 7 is a partially exploded perspective view showing a modification of the cover in the embodiment of the present invention.

According to the modification, for example, two (a pair of) arcuately shaped openings 132 are provided in the cover 24. Each of the arcuately shaped openings 132 is made up from a wide section 134a, and a narrow section 134b, which while communicating with the wide section 134a, is narrower than and has an arc length that is longer than that of the wide section 134a.

Figure 9:
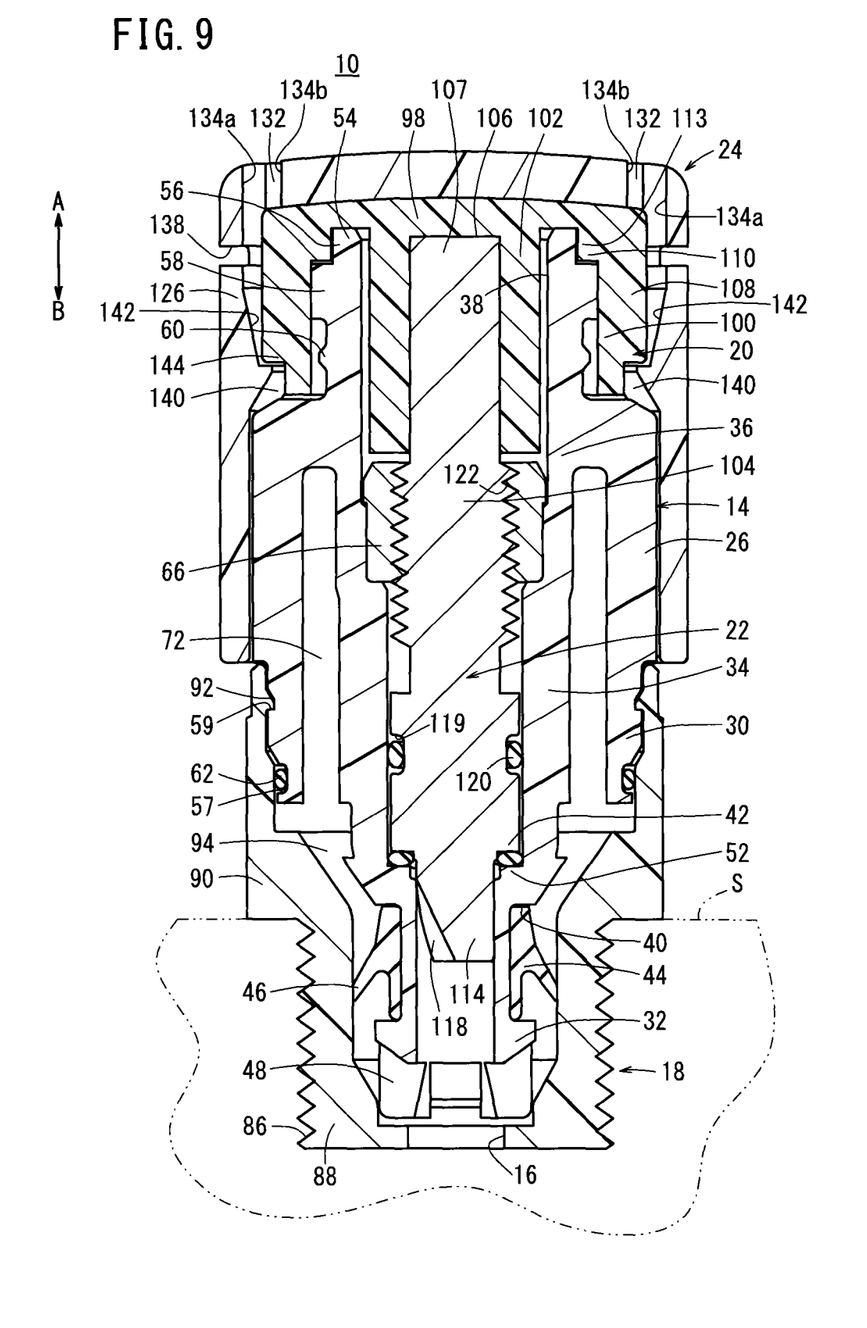
FIG. 9 is a vertical cross sectional view taken along line IX-IX of the flow rate control device shown in FIG. 7.

As shown in FIG. 9, the arcuately shaped openings 132 extend from the top surface of the cover 24 to the inner circumferential surfaces of the release members 126, and terminate at upper parts of the third projections 140. On the upper parts of the third projections 140, inclined sections 142 are provided, which are inclined downwardly from above, so as to approach toward the axis.

Figure 8:
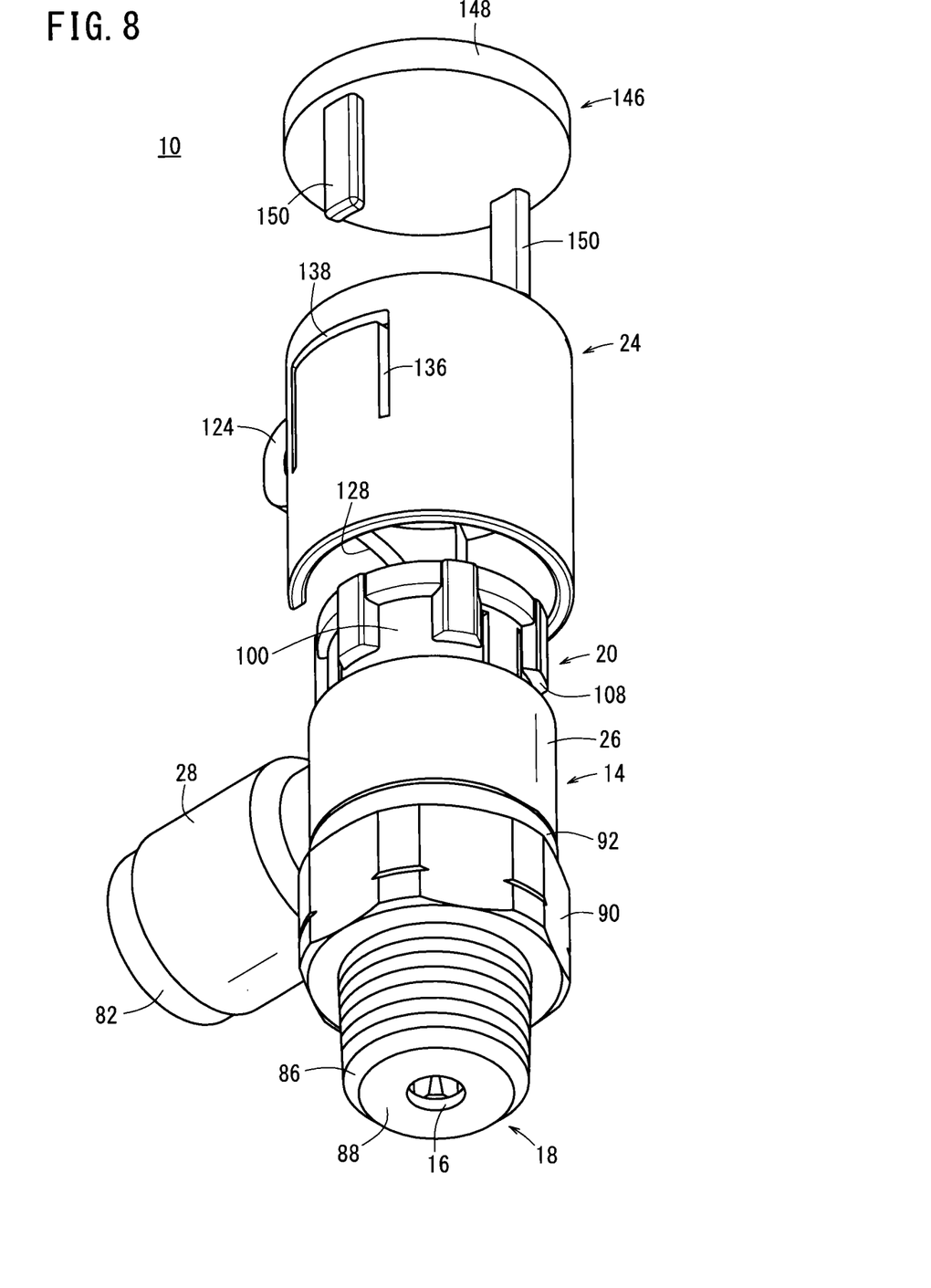
FIG. 8 is a partially exploded perspective view, as seen from below, of a jig and the flow rate control device shown in FIG. 7.

Next, a tool (jig) 146, which is used for detaching the cover 24 from the handle 20, will be described below. As shown in FIGS. 7 and 8, the tool 146 is constituted from a disk-shaped base portion 148, and a pair of insert legs 150, which are disposed to project in the axial direction from one end surface of the base portion 148. The legs 150 have lengths that are slightly longer than the depths of the arcuately shaped openings 132. Further, the distal ends of the legs 150 are provided with tapered shapes, which are slightly reduced in diameter in a radial inward direction.

Figure 10:
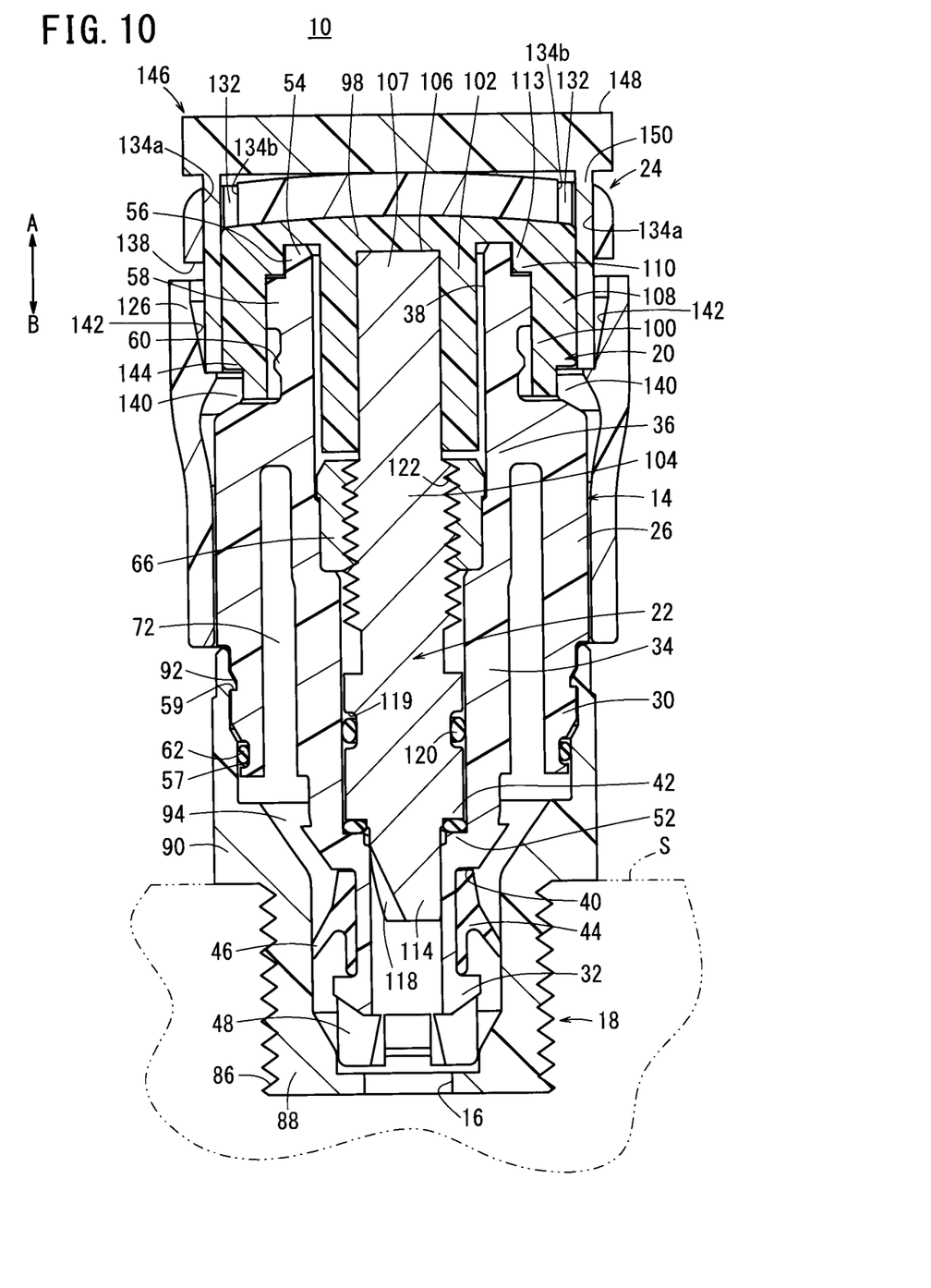
FIG. 10 is a vertical cross sectional view showing a condition in which a tool for enabling removal of the cover from the handle is inserted into an opening of the cover, in the flow rate control device shown in FIG. 7.

The two legs 150 of the tool 146 are inserted into the wide sections 134a of the arcuately shaped openings 132, and the base portion 148 is pressed toward the cover 24. Then, as shown in FIG. 10, the legs 150 are guided along the arcuately shaped openings 132 and press upon and at once expand or spread the inclined sections 142 radially outward, so that the release members 126 are flexed outwardly. As a result, the third projections 140 can be separated at once away from the gripping members 108 of the handle 20.

In order to prevent loss of the tool 146, as shown in FIG. 7, an attachment member 152 may be provided on the base portion 148 of the tool 146. One end of a non-illustrated string may be tied to the attachment member 152, whereas the other end of the string may be tied to the non-illustrated fluid pressure device S, or alternatively, to the tube 74. As a result, loss of the tool 146 can be prevented.

The flow rate control device according to the present invention is not limited to the above-described embodiment. It should be understood that various additional or alternative structures may be adopted therein without deviating from the essential scope of the present invention.

The invention claimed is:

1. A flow rate control device, which by displacement of a needle valve, is configured to control a flow rate of a fluid that flows between a couple of a first port and a second port, comprising:
   a first body including the first port, and which includes a joint mechanism to which a tube is connected that supplies or discharges the fluid;
   a second body connected to the first body, and which includes the second port through which the fluid is discharged or supplied;
   a handle connected to the needle valve, and which is configured to adjust the flow rate of the fluid by causing axial displacement of the needle valve under a rotary action of the handle;
   a cover having an insertion opening into which the handle may be inserted such that the cover surrounds the handle in a removable manner;
   a release member provided on the cover and partially separated from the cover by a groove;
   a projection is disposed on an inner surface of the release member, the projection being able to engage with the handle to thereby attach the cover to the handle, and
   wherein, due to the groove, the release member is able to be flexed outwardly with respect to the cover, about a support region for the release member on the cover, such that engagement of the projection with the handle is released, and wherein the support region is located closer to the opening of the cover than is the projection.

2. The flow rate control device according to claim 1, wherein a shoulder portion, with which the projection of the cover can engage, is disposed on an outer side of the handle.

3. The flow rate control device according to claim 1, further comprising a jig having a leg member, wherein the cover further comprises an arcuately shaped opening configured to accept insertion of the leg member, wherein the release member has an inclined surface engageable by the leg member when the leg member is inserted in the arcuately shaped opening, whereby, by insertion of the jig into the arcuately shaped opening, the jig flexes the release member outwardly, such that engagement of the projection with the handle is released.

4. The flow rate control device according to claim 1, wherein the cover includes a handle portion configured to attach a binding member thereto.

5. The flow rate control device according to claim 4, wherein:

the first body includes a main body section extending in an axial direction, and a connecting section arranged perpendicularly to the axial direction;

the cover includes a cutout that is fitted over a proximal end portion of the connecting section on a side of the main body section such that the cover cannot rotate relative to the first body; and the handle portion is disposed directly above the cutout that is fitted over the proximal end portion on the side of the main body section.

6. The flow rate control device according to claim 5, wherein the connecting section includes the first port.

7. The flow rate control device according to claim 1, wherein:

the first body includes a main body section extending in an axial direction, and a connecting section arranged perpendicularly to the axial direction; and the cover includes a cutout that is fitted over a proximal end portion of the connecting section on a side of the main body section such that the cover cannot rotate relative to the first body.

8. The flow rate control device according to claim 7, wherein the connecting section includes the first port.

* * * * *